United States Patent
Chang et al.

(10) Patent No.: US 8,488,746 B1
(45) Date of Patent: Jul. 16, 2013

(54) METHOD AND SYSTEM FOR SILENT TRUNK FAILURE DETECTION

(75) Inventors: Chuan-Chuen Chang, Holmdel, NJ (US); Li-Jin Wu Chung, Lincroft, NJ (US)

(73) Assignee: AT & T Intellectual Property I, L.P., Atlanta, GA (US)

( * ) Notice: Subject to any disclaimer, the term of this patent is extended or adjusted under 35 U.S.C. 154(b) by 1606 days.

(21) Appl. No.: 11/957,688

(22) Filed: Dec. 17, 2007

(51) Int. Cl.
*H04M 1/24* (2006.01)

(52) U.S. Cl.
USPC ............... 379/22.04; 379/22.06; 379/22.07; 379/22.08; 379/27.01; 370/252; 370/255

(58) Field of Classification Search
USPC .................................................. 379/1.01–35
See application file for complete search history.

(56) References Cited

U.S. PATENT DOCUMENTS

| | | | |
|---|---|---|---|
| 6,600,720 B1 * | 7/2003 | Gvozdanovic | 370/230 |
| 6,636,487 B1 * | 10/2003 | Roy | 370/260 |
| 6,717,920 B1 * | 4/2004 | Cheng | 370/255 |
| 7,042,559 B1 | 5/2006 | Frigo et al. | |
| 7,283,484 B1 * | 10/2007 | Choudhury et al. | 370/252 |
| 2006/0085692 A1 | 4/2006 | Berbaum et al. | |
| 2007/0058529 A1 | 3/2007 | Valdes et al. | |

* cited by examiner

*Primary Examiner* — Duc Nguyen
*Assistant Examiner* — Ibraham Sharifzada
(74) *Attorney, Agent, or Firm* — Fay Kaplun & Marcin, LLP

(57) ABSTRACT

A system and method for performing a first diagnostic test on a first class of service on a network link during a current measurement period, performing at least one further diagnostic test on a second class of service on the network link during the current measurement period, determining whether an alert was present during a previous measurement period and generating a current failure alert based on results of the first and the at least one further diagnostic tests if an alert was present during the previous measurement period.

18 Claims, 4 Drawing Sheets

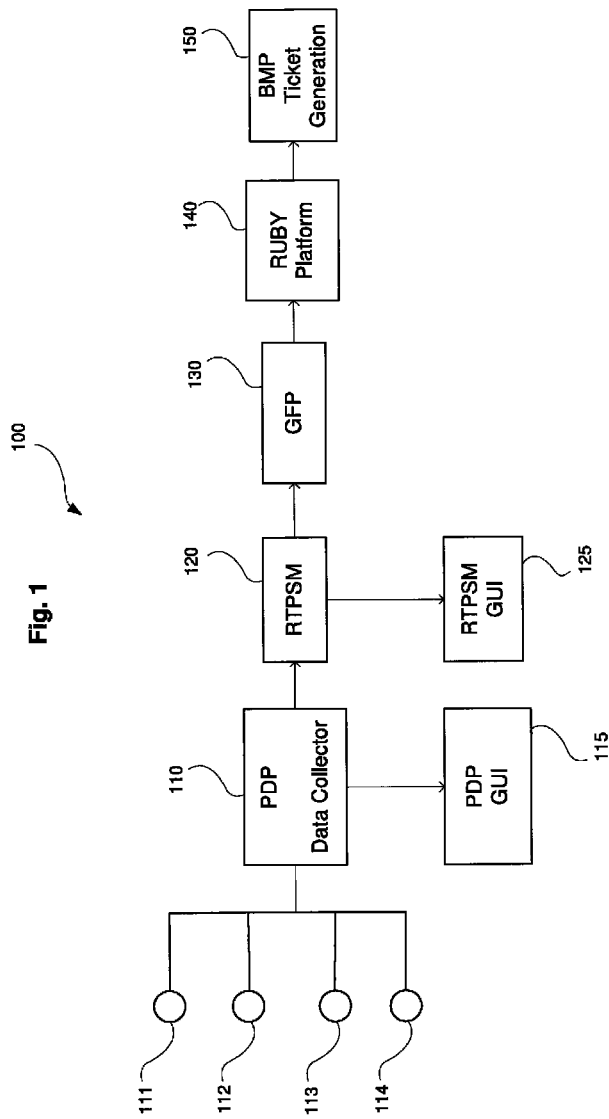

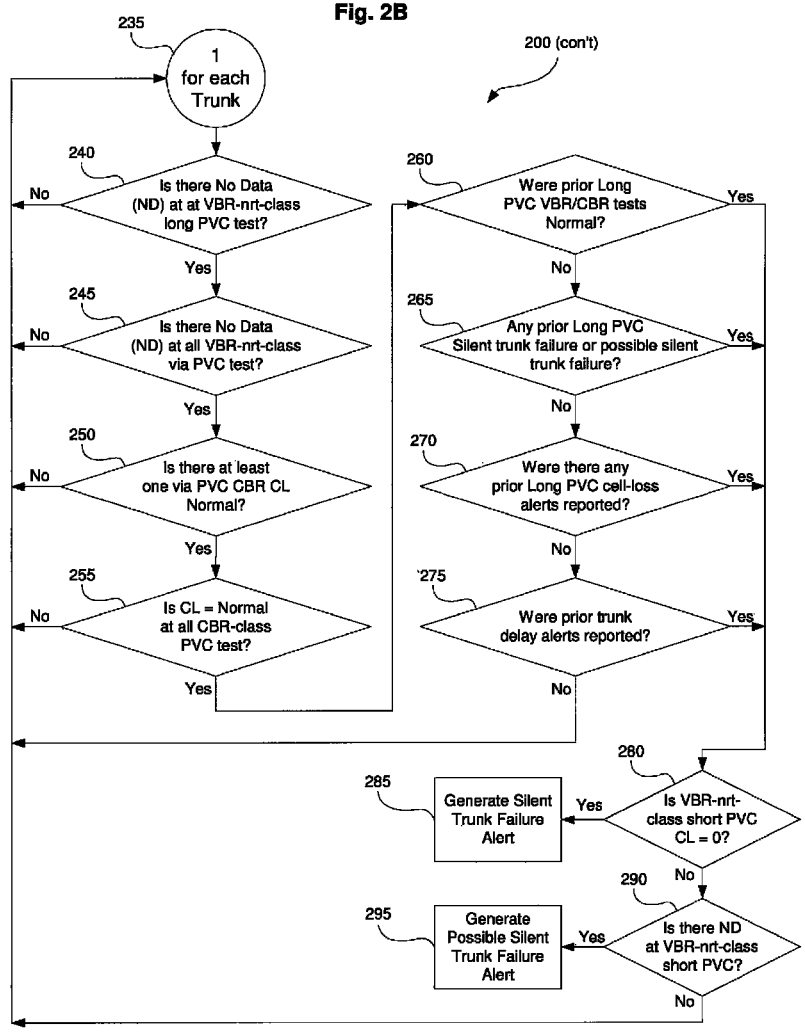

METHOD AND SYSTEM FOR SILENT TRUNK FAILURE DETECTION

BACKGROUND

Within a communication network, link protocols are used to ensure that data transferred from a first device is the same data that is received by a second device. The transfer of data takes place in the data link layer of the Open Systems Interconnection ("OSI") model. Link aggregation at the data link layer of a computer network infrastructure describes a method of using multiple network ports in parallel at a link in order to increase speed in which data is delivered over the link. These multiple network ports create a network trunk that establishes a high-speed backbone network that transfers much more data than any single port within the trunk can deliver. Thus, the use of the trunk allows several networking devices to simultaneously communicate with a centralized server at the full speed of a single network port. Furthermore, the network trunk does not allow any single networking device to monopolize the capacity of the trunk or otherwise interfere with the ability for another network device to communicate with the centralized server over the trunk. In addition to using multiple network ports, link aggregation also allows for multiple network interface cards ("NICs") to be used in parallel within a network trunk.

Due to the number of network devices connected through the trunk and the amount of data that may be transferred over the trunk connection, a system outage or failure at the trunk level may lead to drastic consequences that translate to network downtime, and ultimately losses in productivity and revenue. Unfortunately, every type of network architecture is subject to these potential losses due to system outages and failures. Furthermore, the network architecture may be subject to a condition known as a silent failure, wherein the failure remains undetected by standard fault detection methods. While network management components may be put into place to monitor, interpret, and control the operations of the network, these components are unable to identify or interpret a silent failure condition within the network architecture.

SUMMARY OF THE INVENTION

A method for performing a first diagnostic test on a first class of service on a network link during a current measurement period, performing at least one further diagnostic test on a second class of service on the network link during the current measurement period, determining whether an alert was present during a previous measurement period and generating a current failure alert based on results of the first and the at least one further diagnostic tests if an alert was present during the previous measurement period.

A system having a first testing probe performing a first diagnostic test on a first class of service on a network link during a current measurement period, a second testing probe performing at least one further diagnostic test on a second class of service on the network link during the current measurement period and a data collector receiving diagnostic information corresponding to the diagnostic test from each of the testing probes, determining whether an alert was present during a previous measurement period, and generating a current failure alert if an alert condition was present during the previous measurement period based on the diagnostic information.

BRIEF DESCRIPTION OF THE DRAWINGS

FIG. 1 shows an exemplary system for optimizing routing through gateway selection based on defined criteria according to the present invention.

FIGS. 2A and 2B show an exemplary method for optimizing routing through gateway selection based on defined criteria according to the present invention.

DETAILED DESCRIPTION

Figure 2A:
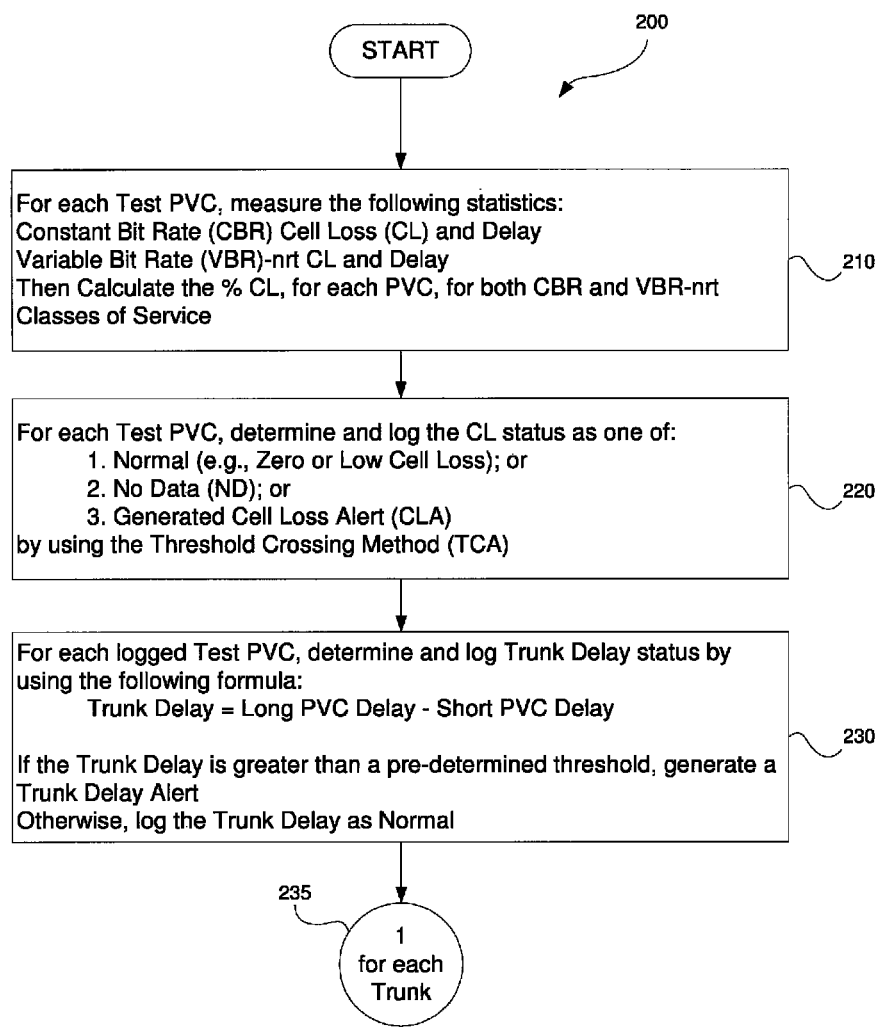

The present invention may be further understood with reference to the following description of exemplary embodiments and the related appended drawings, wherein like elements are provided with the same reference numerals. The present invention is related to systems and methods for preventing network and/or customer outages over a permanent virtual circuit ("PVC") through early detection of PVC one-way trunk failure. Specifically, the present invention is related to systems and methods for detecting, alerting, and ticketing a silent trunk failure at the data link layer through the use of an operational support system ("OSS"), such as a performance data platform ("PDP"). The early detection of a silent trunk failure event may enable maintenance operations personal to troubleshoot the silent failure more effectively, thereby improving the mean time to restore ("MTTR") the PVC trunk failure. Thus, according to the exemplary embodiments of the present invention, a network architecture is capable of providing an automated maintenance process to identify and alert the presence of a silent trunk failure.

The data link layer, or "layer 2" of the OSI model of computer networking, may provide means for transferring data between network devices and for detecting and correcting any errors in the physical layer, or "layer 1" of the OSI model. Within the data link layer, a PVC link may provide a dedicated circuit link, or "port," between two facilities, such as data terminal equipment of a network service provider and a customer. The PVC link may be defined as a highly flexible software-defined logical connection in a frame-relay network. The PVC link established a permanent connection between two link terminals while defining bandwidth requirements between link terminals. Thus, a trunk within the PVC link allows for repeated communications between the facilities over the PVC link, thereby eliminating the need for repeated call set-up and clearing between facilities. In addition, the PVC link may support data streams of both variable bit rate ("VBR") class of service and constant bit rate ("CBR") class of service. Furthermore, the VBR class of service may be distinguished between real-time ("VBR-rt") class and non-real-time ("VBR-nrt") class.

It is possible for a silent trunk failure to be followed by a trunk down condition. A trunk down condition exists when there is an outage of all PVC links (e.g., CBR classes of service and VBR-nrt classes of service). One possible cause for the trunk down condition would be that maintenance personnel deliberately took the trunk out of service as part of a service restoration process. Specifically, the maintenance personnel may identify a malfunctioning or offending component of the system (e.g., a FCP flow control card, a APC flow control card). The component may then be replaced and the system may be restored to normal by warm-booting the component.

While the PVC link allows for great amounts of data to be efficiently transferred between these the provider and the customer, a failure at the PVC trunk may lead to drastic consequences, such as massive data loss (i.e., cell loss) and extended network downtime. The effects of a PVC trunk failure can even greater if the network service provider is unable to detect the failure for a period of time. The undetected trunk failure may be described as a silent trunk failure. The silent trunk failure may arise, for example, out of an error in the handling of congestion of the flow within the VBR-nrt class of service. Specifically, the silent trunk failure may manifest by increasing one-way cell loss of PVC links with VBR-nrt class of service culminating in a one-way outage. However the PVC links with CBR class of service may not be affected.

A trunk down condition is decidedly different from a silent trunk failure. Specifically, a silent trunk failure may only apply to links using VBR class of service. For instance, a trunk down condition will cause a disruption to all of the PVC links on the trunk, thus trunk failure may be described as a two-way failure. In other words, both CBR-class PVC links and VBR-class PVC links on the trunk are down. However, a silent trunk failure only causes a one-way outage to PVC links having VBR-nrt class of service. Accordingly, the PVC links having CBR class of service may not be affected, e.g., the flow of CBR class of service over the PVC is normal with minimal cell loss. As described above, a silent trunk failure may advance into a trunk down condition. Distinguishing between a silent trunk failure and a trunk down condition and relating an ensuing trunk down condition to a silent trunk failure enables maintenance operations personnel to troubleshoot events more effectively and efficiently.

Attempts have been previously presented on to detect PVC silent trunk failure such as simple network management protocol ("SNMP") trap command. However, these attempts have ultimately failed due to the inability for the presented protocols to detect a one-way PVC silent trunk failure. An SNMP trap command is a failure notification sent by a management agent to a management server. While the trap command can report certain significant events that occur on the network, SNMP only generates a trap command following when a PVC trunk is disabled, or there is a PVC trunk down. Since the PVC silent trunk failure is only a one-way failure, the SNMP trap is unable to detect the failure.

FIG. 1 shows an exemplary system 100 for detecting a silent trunk failure via a PDP data collector 110 according to the present invention. Furthermore, the system 100 may be an exemplary performance management operations support system ("PMOSS"). Accordingly, the present invention makes use of testing probes 111-114 at the PDP data collector 110. The testing probes 111-114 may be described as a diagnostic PDP test PVC links that transmit a signal that is looped back at multiple remote uniports of the PDP data collector 110. Through the use of the loop-back signals at the testing probe 111-114, the PDP data collector 110 may detect any loss of data, e.g., cell or packet loss, in one-way transmissions. The testing probes 111-114 may perform either long or short PDP tests, wherein the long PDP tests are performed across several trunks while the short PDP tests are performed across fewer trunks.

According to an exemplary embodiment of the present invention, methods performed by the PDP data collector 110 may capture the data from loop-back signals in order to determine the presence of a unique failure condition. Specifically, the methods may include automation of the failure detection from alarm generation to ticket generation. In other words, the methods may be used to identify any one-way trunk failures that would not be detectable via an SNMP trap or a trunk down alert (i.e., two-way trunk failure). Specifically, cell loss may be detected on the VBR PVC links while no cell loss is observed on the CBR PVC links. The uses of two-way measurements are unsuccessful since these measurements are unable to detect any failure when the CBR traffic is normal.

The methods may be classified as Silent Trunk Failure Methods and Possible Silent Trunk Failure Methods. The Silent Trunk Failure Methods may use the difference of cell loss data measured between a long PDP test PVC and a short PDP test PVC for the VBR class of service while the CBR class of service is normal. The Possible Silent Trunk Failure Methods may provide a lesser degree of confidence of a one-way trunk failure when the short PDP test PVC for the VBR class indicates 100% cell loss, or no data. The methods used for the detection of a silent trunk failure will be described in greater detail below.

As described above, cell and packet data may be delivered via two or more different switch flow control processes. For example, data may be delivered using CBR traffic stream and using VBR traffic stream. The testing probes 111-114 of the PDP data collector 110 may detect a silent trunk failure by comparing one-way cell loss data obtained from both traffic streams. For example, a silent trunk failure event may exist when the percentage loss over the CBR stream is zero, or null, while the percentage loss over the VBR stream is 100%, i.e., no data detected. Upon detecting the silent trunk failure event, the PDP data collector 110 may communicate with additional components of system 100. As will be described in further detail below, the exemplary system 100 may include such additional components as a real-time performance surveillance module ("RTPSM") 120, a global fault-management platform ("GFP") 130, a rule building capability ("RUBY") platform 140, and a business maintenance platform ("BMP") 150.

The RTPSM 120 may be described as a module of an OSS suite that receives performance alerts from various performance data collectors, analyzes the alerts, and forwards correlated alerts to downstream components of the system 100. The GFP 130 may be described as a management system for automating the correlation of alert, alarm, and fault information throughout the system 100. The RUBY platform 140 may be described as a platform for dynamic generation and management of expert rules in order to automate critical operations, such as, for example, customer care, network care, and billing disputes. The RUBY platform 140 may process hundreds of thousands network alarms, orders, and tickets each day. The BMP 150 may be a unified and flexible platform for providing multiple services (e.g., voice, data, frame relay) that may seamlessly integrate and automate various telecommunication management operations, such as, for example, wireless services, local services, cell relay services in Asynchronous Transfer Mode ("ATM"), etc.

Upon detecting an alert at the testing probes 111-114, the PDP data collector 110 may initiate an inter-system flow of alert information in the order of: RTPSM 120, GFP 130, RUBY platform 140, and BMP 150. For a silent trunk failure as well as for a trunk down condition, the alert information may be transmitted immediately, from one component of the system 100 to its downstream partner without any delay. In addition, the various components of the system 100 may be used to time-stamp and ticket the alert information received from each respective upstream partner. According to the exemplary embodiment of the present invention, the system 100 may convert the time-stamps to be consistent with a single time zone. Due to the inherent time-sensitivity of alert information, the testing and detection of cell/packet data may be complicated by the fact that different components of the system 100 may use different time zones for the respective time-stamps. Thus, the system 100 may be aware of the any variation in the time zones among the components of the system 100, including changes due to daylight savings time, and may adjust the time-stamps accordingly.

Before the first declaration of a silent trunk alert, the PDP data collector 110 may have already detected and sent an alert related to cell loss, or a cell loss alert ("CLA"), for the PVC to the RTPSM 120. In order to establish a connection between prior CLAs and the silent trunk failure, the PDP data collector 110 may maintain a history log of all CLAs for inclusion in the silent trunk failure alert information. For example, the history may be a temporary log sent for a predetermined period of time, such as, a two-hour threshold. In addition, the PDP data collector 110 may maintain a further history log for all recorded alerts, including any silent trunk failure alerts. The history logs of the PDP data collector 110 may be displayed to a user of the system 100 via a graphical user interface ("GUI") 115. The history logs may record and display alert information such as, for example, trunk name, network name, alert type (e.g., PDP silent trunk failure, PDP possible silent trunk failure, PDP trunk down, PSP possible trunk down, PDP trunk loss percentage, PDP trunk delay, PDP trunk jitter, etc.), criticality (e.g., minor, major, critical, etc.), start time, duration period, alert contents, prior alert information, the identities ("IDs") of the long PVC links and short PVC links used to measure the silent trunk failure, the delay/loss raw measured data from these links, etc. The GUI 115 may provide the user with the ability to sort the history logs by various attributes.

Once the PDP data collector 110 detects a silent trunk failure, it may repeatedly generate alert information for which a failure is detected for a particular trunk. For each, the PDP data collector 110 may segment time into 15-minute periods and generate the alert information for each 15-minute period in which a failure is detected. The PDP data collector 110 may then transmit the alert information to the RTPSM 120 via a distributed data bus ("DDB") of the system 100. The transfer of the alert information may be accomplished by a means of a periodic file transfer placed on a designated directory location on a server of the RTPSM 120. The RTPSM 120 may display the alert information on its GUI 125. Furthermore, the RTPSM 120 may also process the alert information for transmission to the GFP 130. As part of the processing, the RTPSM 120 may convert all time stamp information received from the PDP data collector 110 into one standardized time zone (e.g., Greenwich Mean Time ("GMT")). In addition, the RTPSM 120 may also assign a trap number for each alert. The trap numbers may be new numbers based on the type of alert. For example, PDP silent trunk failures may be assigned the trap number of 1006, and PDP possible silent trunk failures may be assigned the trap number of 1007.

According to the exemplary embodiments of the present invention, the RTPSM 120 may compute an elapsed time of an open alert duration and a completed time of a closed alert duration. As described above, the PDP data collector 110 may periodically send out alert information for a particular trunk. The time may be segmented into predetermined intervals, such as, for example, 15-minute intervals. Thus, according to this example, for every 15 minutes, the PDP data collector 110 may either send or not send an alert for a trunk. Accordingly, the RTPSM 120 may define the alert duration and may also determine if the current alert provided by the PDP data collector 110 corresponds to an existing alert duration or to a new alert duration. For a particular trunk, the start of a silent trunk failure alert duration may be defined by the 15-minute interval in which the PDP data collector 110 sends the first silent trunk failure alert. When there are no further alerts for a set period of time, the RTPSM 120 may transmit an end alert. The end alert of the silent trunk failure alert duration may be defined by the multiple (e.g., three) consecutive 15-minute intervals in which no silent trunk failure alerts, possible silent trunk failure alerts, trunk down alerts, or possible trunk down alerts have been sent by the PDP data collector 110 for a particular trunk. The next alert duration may then start with the receipt of the first 15-minute intervals in which the PDP data collector 110 sends a new alert for a particular trunk.

During a silent trunk failure alert duration, the RTPSM 120 may define the alert information. Specifically, the RTPSM 120 may determine if the current alert corresponds to an existing alert or, alternatively, if the current alert is a new alert. Accordingly, the RTPSM 120 may transmit a "new alert" for the first alert of the alert duration; a "continuing alert, for alerts received during the alert duration; a "clear alert" at the end of the alert duration. Furthermore, the RTPSM 120 may compute/elapsed time of an alert duration base on a PDP detect time. The PDP detect time may correspond to the PDP time stamp of the first alert of the alert duration. Therefore, the elapsed time of an open alert duration may be defined by the difference between the time stamp time of the current alert and the PDP detect time of the alert duration. Likewise, the completed time of a closed alert duration may be defined by the difference between the time stamp of the cleared alert and the PDP detect time of the alert duration. As described above, the alerts may be either silent trunk failure alerts or trunk down alerts. In addition, the elapsed/completed time of the alert duration may be included in a display of alert information in the GUI 125 of the RTPSM 120. Then, the RTPSM 120 may transmit the defined alert information downstream to the GFP 130.

Once the GFP 130 receives the alert information from the RTPSM 120, the GFP 130 processes the information by correlating the PDP silent trunk alerts with any outstanding trunk alarms (e.g., a layer 2 alarm). According to the exemplary embodiment of the present invention, if the GFP 130 correlates the PDP silent trunk alert with an outstanding trunk alarm, the GFP 130 may set the trunk alarm as a primary alert and set the PDP silent trunk alert as a secondary alert. Alternatively, if the GFP 130 does not correlate the PDP silent trunk alert with an outstanding trunk alarm, the GFP 130 may set the PDP silent trunk alert as the primary alert.

The GFP 130 may then transmit the primary PDP alert, and secondary PDP alert, if needed, to the RUBY platform 140. The system 100 may have a rule in place to limit the number of PDP alerts per trunk, per day. For example, system 100 may have rule in place that states that for each day, no more than twenty-four PDP alerts may be sent to the RUBY platform 140 by each of the trunk. Thus, the rule may reduce the volume of alerts processed by the RUBY platform 140. While this may not be an expected issue for silent trunk failure alerts, the rule may eliminate excessive alerts from other PDP alerts, such as, trunk delay alerts. Thus, the rule may ensure that the expected volume of PDP alerts processed by the RUBY platform 140 will not be exorbitant.

Upon receiving a new alert from the GFP 130, the RUBY platform 140 may forward the alert information to the BMP 150 for generating a silent trunk failure ticket. The ticket may be populated with the content of the alert information received by the RUBY platform 140 from the GFP 130. The content of a PDP silent trunk failure alert may be similar to a PDP trunk down alert. As described above, the PDP silent trunk failure alert for a 15-minute interval may contain at least trunk information, time the silent trunk failure was detected, the alert type, the IDs of the long PVC link and of the short PVC links that measured the silent trunk failure, the recorded delay/loss data, any associated alerts with the silent trunk occurring in the previous two hours, etc. An additional PDP report may list all of the alerts for PDP silent trunk failure over 15-minute intervals within the past seven days. Similar reports may list alerts related 15-minute intervals for PDP trunk down alerts, PDP trunk loss percentage, PDP trunk delays, PDP trunk jitter, etc. within a seven-day period. In the cases where alert information received from the GFP 130 relates to an existing ticket for a trunk, the RUBY platform 140 may correlate the alert information with the existing ticket and the BMP 150 may send only one ticket for the same trunk. Specifically, the correlation of the alert information may associate the PDP silent trunk failure alert with other layer 1 OSS trunk down alerts.

FIG. 2A shows an exemplary method 200 for automatic detection of silent trunk failures via the PDP data collector 110 according to the present invention. This method 200 also allows for automatically generating of an alert, processing alert information, and providing ticket notifications of the alert. Furthermore, method 200 allows for earlier detection of trunk failures and enables efficient troubleshooting by maintenance personnel, thereby preventing any customer outages and network outages. Thus, the exemplary method 200 may improve the performance of measures such as MTTR while also reducing exposure to rebated revenue due to unmet customer service targets. The exemplary method 200 will be described with reference to the exemplary system 100 of FIG. 1.

As described above, an exemplary embodiment of the present invention uses an inter-system flow of alert information from the PDP data collector 110, for detecting a failure, to the RTPSM 120, for processing the alert information, to the GFP 130, for correlating the alert information, to the RUBY platform 140 and the BMP 150, for ticket generation. Thus, a PDP silent trunk failure alert or a PDP possible silent trunk failure alert may be generated at the PDP data collector 110 and sent downstream, to the subsequent inter-system partner.

One indication of a silent trunk failure may be heavy cell-loss experienced over the one-way VBR-nrt PVC links. Furthermore, there may be no cell loss experienced over the CBR PVC links. According to the exemplary method 200, a PDP silent trunk failure alert or a PDP possible silent trunk failure alert may be continuously transmitted from the PDP data collector 110 to each of the downstream components until the trunk has been fixed and has been brought back into service. These alerts may be monitored according to a set duration of repeated intervals, such as, for example, 15-minute intervals. Thus, for every 15-minute interval, the PDP collector 110 may determine whether a failure has been detected.

In step 210, the PDP data collector 110 may keep track of the percentage of cell loss detected and the roundtrip delay ("RTD") detected over a designated period of time or threshold time, such as, for example, twenty-four hours. The PDP data collector 110 may monitor the cell-loss and delay over multiple classes of service, such as VBR-nrt and CBR classes during the exemplary 15-minute intervals. Specifically, the PDP data collector 110 may measure any cell loss and delay detected for the constant bit rate (CBR) class at each PVC link. In addition, the PDP data collector 110 may further measure any cell loss and delay detected for the variable bit rate non-real-time (VBR-nrt) class at each PVC link. Thus, once these measurements are taken, the PDP data collector 110 may then calculate the percentage of cell loss over each PVC link for each of the classes of service.

In step 220, the PDP data collector 110 may determine and log the status of cell loss detected over each of the PVC link. The cell loss status may be determined through the use of a threshold value in the calculated percentage of cell loss from step 210. In other words, the status of the cell loss may be based upon a predetermined percentage threshold measured at each of the PVC links. Accordingly, the status of cell loss detected may be defined as "Normal" when there is zero or low cell loss detected (i.e., CL=Normal). Alternatively, the status may be defined as no data ("ND") when there is insufficient data available at the specific PVC link (i.e., CL=ND). Furthermore, the status may be defined as creating a cell loss alert ("CLA") at a specific PVC link (i.e., CL=CLA). Therefore, the PDP data collector 110 may maintain a log for CLAs generated for each of the PVC links. The PDP data collector 110 may keep track of the type of CLA and the criticality of the alerts for each class of server, e.g., VBR-nrt and CBR, over the twenty-four hour period. The CLAs may indicate a PDP trunk percentage loss for a given 15-minute interval. Furthermore, the alert may be classified based on criticality, such as, for example, minor, major, critical, etc.

In step 230, the PDP data collector 110 may determine and log the status of any trunk delay for each logged test PVC. The PDP data collector 110 may calculate a trunk delay by subtracting the delay data measured at the short PDP test PVC from the delay data measured at the long PDP test PVC. This difference in delay may define the status of the trunk delay. Specifically, if the trunk delay is greater than a predetermined threshold delay value, then the PDP data collector 110 may generate a trunk delay alert. However, if the calculated trunk delay is not greater than the threshold delay value, then the PDP data collector 110 may log the trunk delay as normal Upon determining the above-mentioned statistics and logging the cell-loss status for each PDP test PVC and trunk delay status for each trunk, the method 200 may advance to step 235. In step 235, the method 200 may advance to the step illustrated in FIG. 2B for each network trunk. Specifically, at each trunk, the PDP data collector 110 may perform silent trunk failure detection in order to generate a silent trunk failure alert or a possible silent trunk failure alert.

Referring now to FIG. 2B, in step 240, the PDP data collector 110 may determine, during a measurement period (e.g., a 15-minute interval), whether there is no data ("ND") detected over the long PDP test PVC having VBR-nrt class of service. As described above, ND may be defined as the percentage loss over the VBR stream being at 100%. In other words, there is insufficient data available at the specific PVC link (i.e., CL=ND). The long PVC test is a test performed by one or more of the testing probes 111-114 across a large number of trunks. According to an exemplary embodiment of the present invention, if there is ND recorded at the VBR-nrt-class long PVC test, then the method 200 may advance to step 245. If ND is not recorded during the measurement period, the method 200 may return to step 235 in order to log transmission information for that specific trunk during the next measurement period (e.g., the next 15-minute interval).

In step 245, the PDP data collector 110 may determine, during the same measurement period (e.g., the 15-minute interval), whether there is ND detected for all the via PDP test PVCs having VBR-nrt class of service over the trunk. The via PVC test is a test performed by one or more of the testing probes 111-114 across a small number of trunks. If there is ND recorded for all the via PVC test, then at step 245, then the method 200 may advance to step 250. If ND is not recorded for at least one via PVC having VBR-nrt class of service during the measurement period, the method 200 may return to step 235 in order to log transmission information for that specific trunk during the next measurement period (e.g., the next 15-minute interval).

In step 250, the PDP data collector 110 may determine, during the same measurement period (e.g., the 15-minute interval), whether the cell-loss is normal over at least one of the via PDP test PVCs for the trunk having CBR classes of service. According to an exemplary embodiment of the present invention, the PVCs having no cell-loss (i.e., neither NS nor ND data transmissions) may be considered to be operating as normal. If the cell-loss is normal for at least one PVC CBR test, then the method advances to step 255. However, if none of the CBR-class PVC tests have cell-loss of normal, the method may return to step 235.

In step 255, the PDP data collector 110 may determine, during the same measurement period (e.g., the 15-minute interval), whether the cell-loss is normal over all of the long or the short PDP test PVCs for the trunks having CBR classes of service. If the data transmissions across all of the CBR-class PVC links are not normal (e.g., experiencing 100% cell loss or ND), then both classes of service may be failing and the PDP data collector may be the result of a trunk down, and the method 200 may return to step 235. However, if at least one of the CBR-class PVC links is normal and there is ND recorded at the long PVC tests, the method 200 may advance to step 260.

In steps 260-275, a series of conditions may be taken into consideration based on the previous determinations of steps 240-255. The existence of any of the conditions described in reference to step 260-275 may trigger the PDP data collector 110 to generate a silent trunk failure alert for the current measurement time. As will be discussed in greater detail below, the series of conditions may describe specific circumstances for the PVC links according to the most recent measurement period prior to the current measurement period in order to determine whether a silent alert condition exists.

In step 260, the PDP data collector 110 may examine the logs of the prior measurement period to determine whether both the long PDP test PVC for the trunk having VBR-nrt class of service and the long PDP test PVC for the trunk having CBR class of service were normal. If both the prior long VBR-nrt-class PVC links and long CBR class PVC links were normal, then a silent alert condition may exist and the method 200 may advance to step 280. However, if the prior long VBR-nrt-class PVC links and the prior long CBR class PVC links were not normal (e.g., experiencing cell loss), then the method 200 may examine the next condition of the series in step 265.

In step 265, the PDP data collector 110 may examine the logs of the prior measurement period to determine whether a long PVC silent trunk failure or a possible silent trunk failure was recently detected. If either a long PVC silent trunk failure or a possible silent trunk failure existed in the prior measurement period, then a silent alert condition may exist and the method 200 may advance to step 280. However, if neither a silent trunk failure nor a possible silent trunk failure existed for the long PVC tests, then the method 200 may examine the next condition of the series in step 270.

In step 270, the PDP data collector 110 may examine the logs of the prior measurement period to determine whether a long PVC CLA was recently generated. If a long PVC CLA was reported in the prior measurement period, then a silent alert condition may exist and the method 200 may advance to step 280. However, if there was no CLA in the prior measurement period for the long PVC tests, then the method 200 may examine the next condition of the series in step 275.

In step 275, the PDP data collector 110 may examine the logs of the prior measurement period to determine whether a trunk delay alert was recently generated. If a trunk delay alert was reported in the prior measurement period, then a silent alert condition may exist and the method 200 may advance to step 280. However, if there was no trunk delay alert in the prior measurement period, then the method 200 may return to step 235 in order to log transmission information during the next measurement period (e.g., the next 15-minute interval).

In step 280, the PDP data collector 110 may determine whether the cell loss over VBR-nrt-class short PVC links was normal, e.g., low cell loss or zero cell loss (CL=0). If the cell loss VBR-nrt-class short PVC links was normal, then in step 285 the PDP data collector 110 may declare a silent trunk failure and generate a PDP silent trunk failure alert for the current measurement period and transmit the alert to the RTPSM 120. However, if the cell loss over VBR-nrt-class short PVC links was not normal (e.g., these was significant cell loss or ND), then the method 200 may advance to step 290.

In step 290, the PDP data collector 110 may determine whether there is ND detected over VBR-nrt-class short PVC links, e.g., no cells detected or complete cell loss (CL=%100). If there is ND detected at VBR-nrt-class short PVCs, then in step 290 the PDP data collector 110 may declare a possible silent trunk failure and generate a PDP possible silent trunk failure alert for the current measurement period and transmit the alert to the RTPSM 120.

Figure 3:
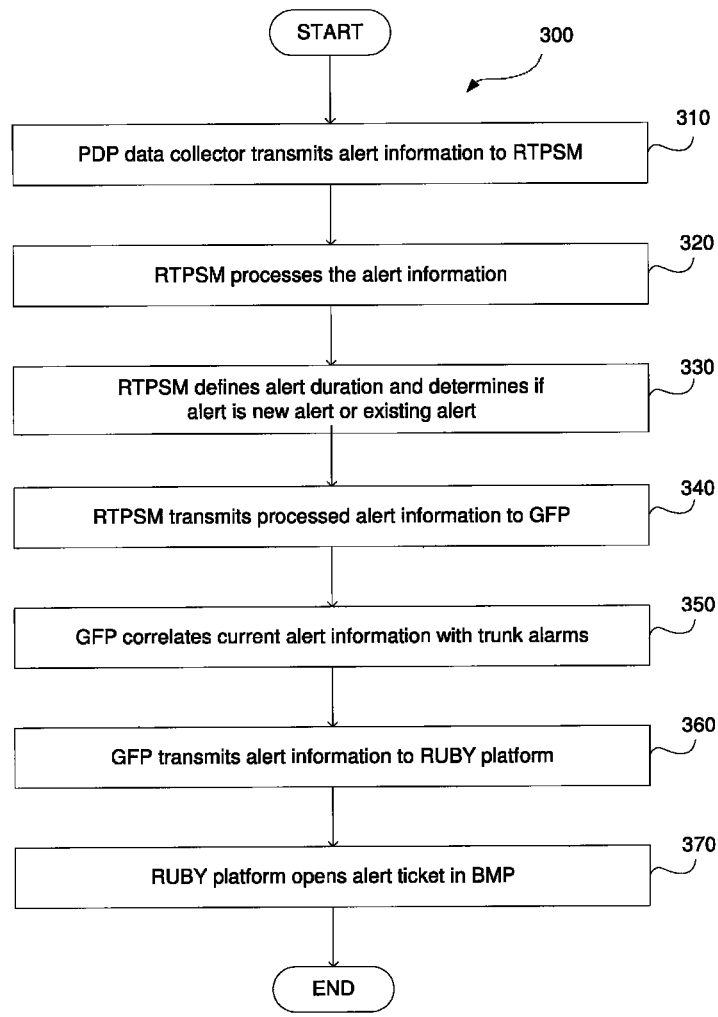
FIG. 3 shows an exemplary method for processing a silent trunk failure or a possible silent trunk failure from the performance data platform data collector according to the present invention.

FIG. 3 shows an exemplary method 300 for processing a silent trunk failure or a possible silent trunk failure from the PDP data collector 110 according to the present invention. The exemplary method 300 will be described with reference to the exemplary system 100 of FIG. 1. As described above, the PDP data collector 110 may initiate an inter-system flow of alert information between each of the components of the system 100. The alert information may be transmitted immediately from one component to its downstream partner without delay.

In step 310, the PDP data collector 110 may transmit any alert information to the RTPSM 120. The alert information may include the end result of the method 200, as well as any of the maintained logs related to prior cell-loss delays/alerts. Accordingly, the PDP data collector 110 may transmit either a silent trunk failure alert or a possible silent trunk failure alert to the RTPSM 120. The transmission of alert information may be performed via the DDB of the system 100.

In step 320, the RTPSM 120 may process the alert information received from the PDP data collector 110. In addition, the RTPSM 120 may display the alert information on the GUI 125. As part of the processing, the RTPSM 120 may convert any received time-stamp data into a single consistent frame-of-reference time, i.e., a single time zone. Furthermore, the RTPSM 120 may assign a trap number to the alert information depending on the type of alert determined by the PDP data collector. For example, the RTPSM 120 may assign a trap number of 1006 for a PDP silent trunk failure alert and a trap number of 1007 for a possible silent trunk failure alert.

In step 330, the RTPSM 120 may define an alert duration and determine if the current alert corresponds to an existing alert or a new alert based on the logs related to prior cell-loss delays/alerts. If the current alert corresponds to an existing alert, the RTPSM 120 may increase the duration of the existing alert. If the current alert does not corresponds to an existing alert, the RTPSM 120 may indicate a start time of a new alert. Thus, the start time of a new alert for particular PVC link may be defined by the measurement period (e.g., 15-minute interval) when the PDP data collector 110 initially sends the silent trunk failure alert (or possible silent trunk failure alert) to the RTPSM 120. The end time of any alert for a particular PVC link may be defined by the measurement period (e.g., 15-minute interval) prior to the start of multiple periods having no alerts (e.g., three consecutive 15-minute intervals without an alert) from the PDP data collector 110. Therefore, the RTPSM may compute the elapsed duration of an open alert and the completed time of a closed alert for any new silent trunk failure alerts and the existing trunk down alerts. In addition, the elapsed duration or completed time of each of the alerts may be included in the display of the GUI 125.

In step 340, the RTPSM 120 may transmit the processed alert information to the GFP 130. In step 350, the GFP 130 may correlate the current alert information with any outstanding trunk alarms and set primary and secondary alerts. If the PDP silent trunk alert correlates with an outstanding trunk alarm, then the GFP 130 may set the trunk alarm as the primary alert and the PDP silent trunk alert as the secondary alert. If the PDP silent trunk alert does not correlate with an outstanding trunk alarm, the GFP 130 may set the PDP silent trunk alert as the primary alert.

In step 360, the GFP 130 may transmit the alert information to the RUBY platform 140. According to an exemplary embodiment of the present invention, as described above, the method 300 may enforce a rule that limits the number of alerts that the GFP 130 may transmit to the RUBY platform 140. For example, the rule may limit the number of PDP alerts to twenty-four alerts.

In step 370, the RUBY platform 140 may open an alert ticket in the BMP 150 upon receiving the alert information from the GFP 130. The alert ticket in the BMP 150 may be populated with the content of the alert information. This content may include, the source name of the offending PVC link, the start time of the alert, the criticality of the alert, the type of alert, IDs of the switches with the offending PVC link, class of service, any alarm text, etc.

While the above described systems and methods according to various embodiments of the present invention describe single components for each of the component types, there may be any number of components for each component type. For example, there may be plurality of PDP data collectors performing the functions of the PDP data collector 110. In addition, the GFP 130 may receive alerts from several RTPSMs and correlate the data received from all of the RTPSMs.

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. A method, comprising:
   performing a first diagnostic test on a first class of service on a network link during a current measurement period;
   performing a second diagnostic test on a second class of service on the network link during the current measurement period;
   determining whether an alert was present during a previous measurement period;
   generating a current failure alert based on the first diagnostic test on the first class of service indicating data loss, and the second diagnostic test on the second class of service indicating no data loss, and an alert was present during the previous measurement period;
   performing a further diagnostic test on the first class of service on the network link during the current measurement period, wherein the current failure alert is test also generated if the further diagnostic test on the first class of service detects data loss, the second diagnostic test on the second class of service indicates no data loss, and an alert was present during the previous measurement period; and
   wherein the current failure alert is a silent trunk failure alert when both the first and the further diagnostic tests of the first class of service detect data loss and the second diagnostic test of the second class of service detects no data loss.

2. The method according to claim 1, wherein the first diagnostic test and the second diagnostic test are performed using a testing probe.

3. The method according to claim 1, wherein the first diagnostic test is one of a long test performed across a permanent virtual circuit and a short test performed across the permanent virtual circuit.

4. The method according to claim 1, wherein one of the first diagnostic test, the second diagnostic test, and the further diagnostic test is a looped signal detecting loss in one-way transmission of data over the network link.

5. The method according to claim 1, wherein the first class of service is transmitted at a variable bit-rate in non-real-time and the second class of service is transmitted at a constant bit-rate.

6. The method according to claim 1, wherein the alert present during a previous measurement period is one of cell-loss alert, a trunk delay alert, a silent trunk failure alert, and a possible silent trunk failure alert.

7. The method according to claim 1, wherein the current failure alert is a possible silent trunk failure alert when the first diagnostic test of the first class of service detects data loss, the further diagnostic test of the first class of service detects no data loss, and the second diagnostic test of the second class of service detects no data loss.

8. The method according to claim 1, further comprising:
   determining if the current failure alert corresponds to a previous failure alert of a previous measurement period;
   if the current failure alert corresponds to the previous failure alert, increasing a pervious previous duration of the previous failure alert;
   if the current failure alert does not correspond to the previous failure alert, indicating a start time of a current duration of the current failure alert; and
   ending the current duration of the current failure alert once there are no further failure alerts generated for a designated period of time.

9. The method according to claim 1, further comprising:
   correlating the current failure alert with a previous trunk alarm;
   opening a ticket, the ticket including alert content information related to the current failure alert.

10. A system, comprising:
    a first testing probe performing a first diagnostic test on a first class of service on a network link during a current measurement period;
    a second testing probe performing a second diagnostic test on a second class of service on the network link during the current measurement period;
    a data collector receiving diagnostic information corresponding to the first diagnostic test and the second diagnostic test, determining whether an alert was present during a previous measurement period, and generating a current failure alert if an alert condition was present during the previous measurement period, and the first diagnostic test on the first class of service indicates data loss, and the second diagnostic test on the second class of service indicates no data loss;
    a third testing probe performing an additional diagnostic test on a first class of service on the network link during the current measurement period, wherein the current failure alert is also generated if the additional diagnostic test on the first class of service indicates data loss, the second diagnostic test on the second class of service indicates no data loss, and an alert condition was present during the previous measurement period; and wherein the current failure alert is a silent trunk failure alert when both the first and the additional diagnostic tests of the first class of service detect data loss and the second diagnostic test of the second class of service detects no data loss.

11. The system according to claim 10, wherein the first diagnostic test is one of a long test performed across a permanent virtual circuit and a short test performed across the permanent virtual circuit.

12. The system according to claim 10, wherein the first class of service is transmitted at a variable bit-rate in non-real-time and the second class of service is transmitted at a constant bit-rate.

13. The system according to claim 10, wherein the alert present during a previous measurement period is one of cell-loss alert, a trunk delay alert, a silent trunk failure alert, and a possible silent trunk failure alert.

14. The system according to claim 10, wherein the current failure alert is a possible silent trunk failure alert when the first diagnostic test of the first class of service detects data loss, the additional diagnostic test of the first class of service detects no data loss, and the second diagnostic test of the second class of service detects no data loss.

15. The system according to claim 10, further comprising:
a real-time performance surveillance module receiving the current failure alert from the data collector, determining if the current failure alert corresponds to a previous failure alert of a previous measurement period, if the current failure alert corresponds to the previous failure alert, increasing a previous duration of the previous failure alert, if the current failure alert does not correspond to the previous failure alert, indicating a start time of a current duration of the current failure alert, and ending the current duration of the current failure alert once there are no further failure alerts generated for a designated period of time.

16. The system according to claim 14, further comprising:
a global fault management platform receiving the current failure alert from the real-time performance surveillance module, correlating the current failure alert with a previous trunk alarm, and transmitting the correlated alert/alarm; and a rule building capability platform receiving the correlated alert/alarm transmitted from the global fault management platform and opening a ticket in a business maintenance platform, wherein the ticket includes alert content information related to the current failure alert.

17. The system according to claim 14, further comprising:
a first graphical user interface for displaying to a user the diagnostic information received at the data collector; and a second graphical user interface for displaying to the user one of the current failure alert and a previous failure alert.

18. A tangible computer readable storage medium including a set of instructions executable by a processor, the set of instructions, when executed by the processor, instructing the processor to perform a method comprising:
performing a first diagnostic test on a first class of service on a network link during a current measurement period;
performing a second diagnostic test on a second service on the network link during the current measurement period;
determining whether an alert was present during a previous measurement period; and
generating a current failure alert if the first diagnostic test on the first class of service indicates data loss, and the second diagnostic test on the second class of service indicates no data loss, and an alert was present during the previous measurement period;
performing a further diagnostic test on the first class of service on the network link during the current measurement period, wherein the current failure alert is test also generated if the further diagnostic test on the first class of service detects data loss, the second diagnostic test on the second class of service indicates no data loss, and an alert was present during the previous measurement period; and
wherein the current failure alert is a silent trunk failure alert when both the first and the further diagnostic tests of the first class of service detect data loss and the second diagnostic test of the second class of service detects no data loss.

* * * * *